Jan. 5, 1937. C. L. EASTBURG 2,066,879
ROLLER BEARING AXLE CONSTRUCTION
Filed Jan. 2, 1935 3 Sheets-Sheet 1
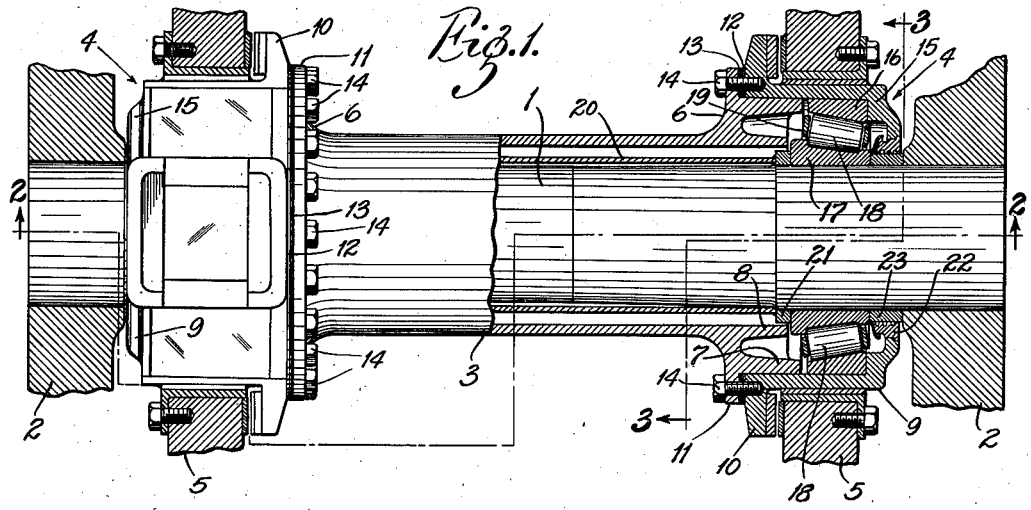
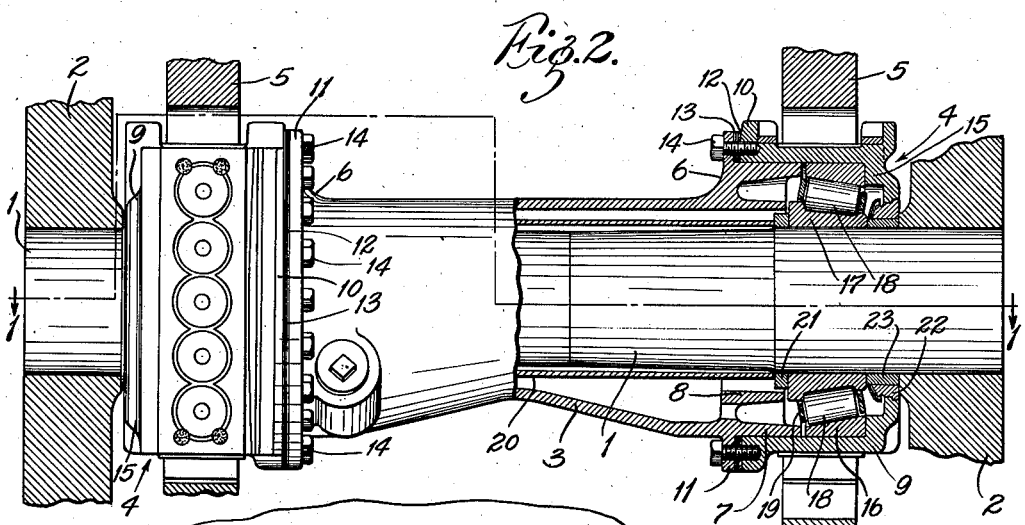
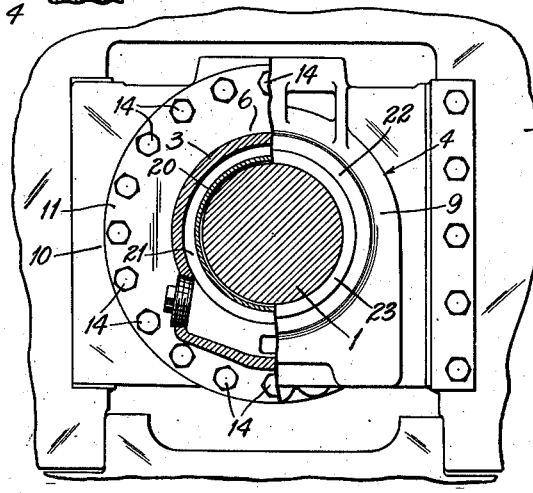
INVENTOR:
Clifford L. Eastburg,
by Carrlan Gravely,
HIS ATTORNEYS.

Jan. 5, 1937.　　　C. L. EASTBURG　　　2,066,879
ROLLER BEARING AXLE CONSTRUCTION
Filed Jan. 2, 1935　　　3 Sheets-Sheet 2
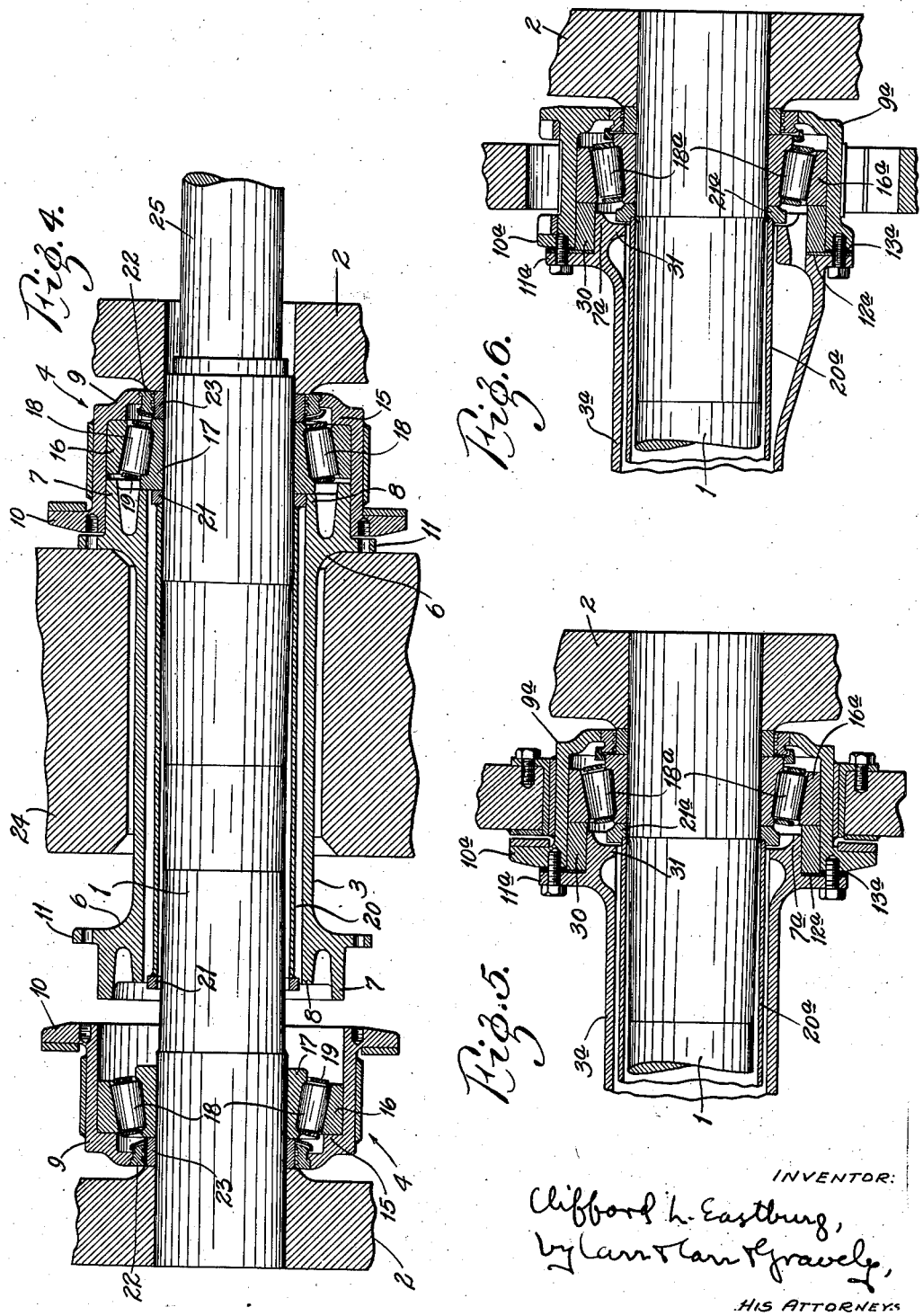
INVENTOR:
Clifford L. Eastburg,
by Cam Van Gravely,
HIS ATTORNEYS Jan. 5, 1937. C. L. EASTBURG 2,066,879
ROLLER BEARING AXLE CONSTRUCTION
Filed Jan. 2, 1935  3 Sheets-Sheet 3
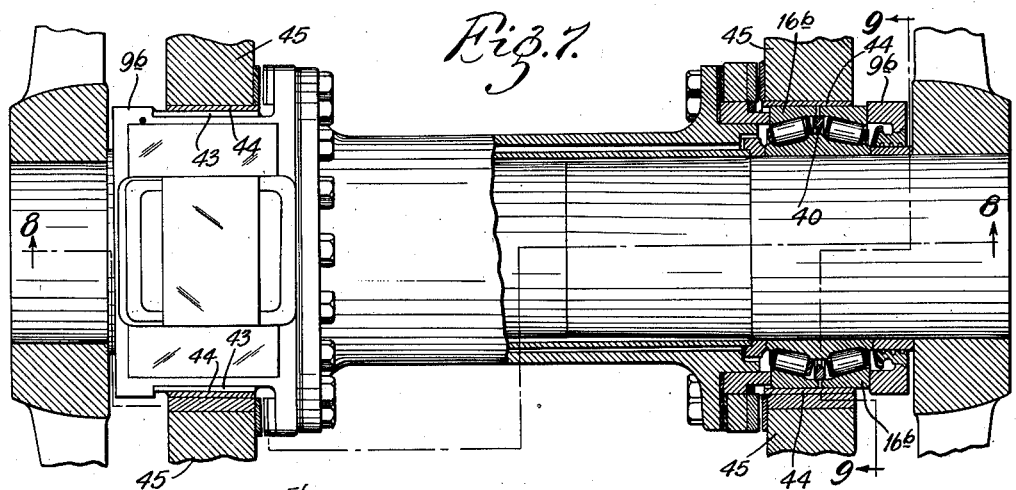
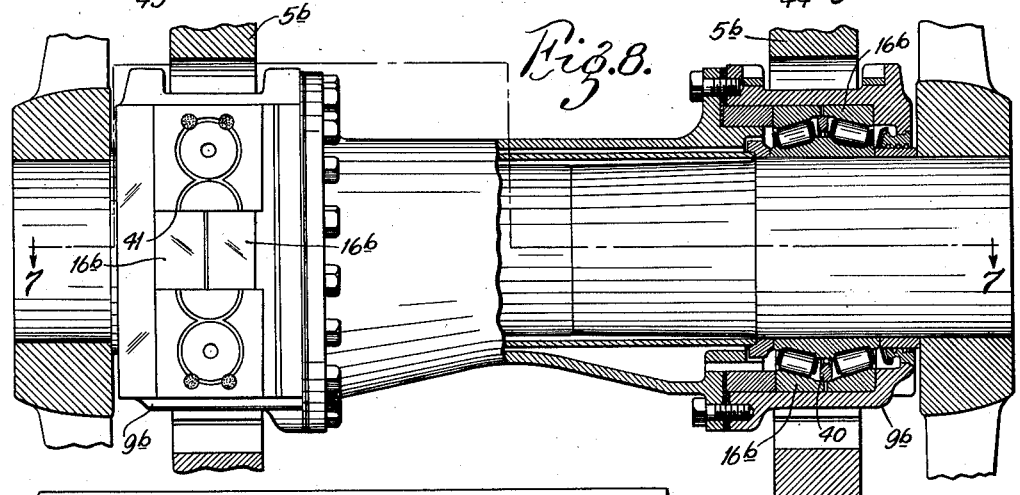
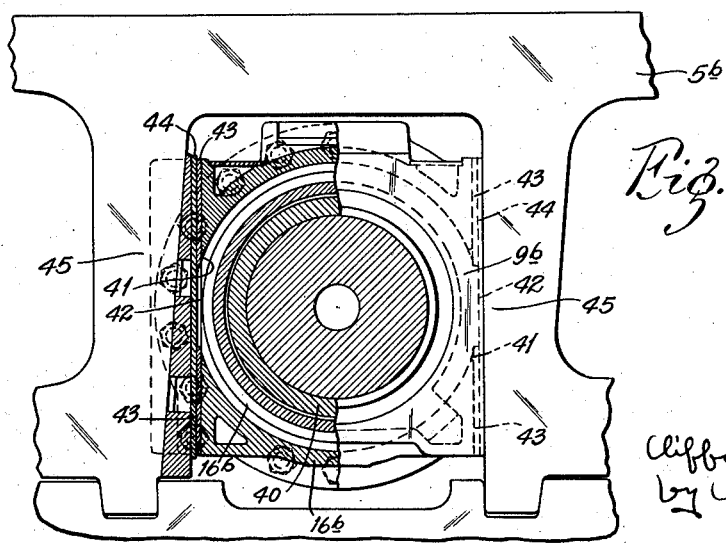
INVENTOR:
Clifford L. Eastburg,
by Carr Kart Gravely
HIS ATTORNEYS.

Patented Jan. 5, 1937

2,066,879

UNITED STATES PATENT OFFICE 2,066,879

ROLLER BEARING AXLE CONSTRUCTION

Clifford L. Eastburg, Canton, Ohio, assignor to The Timken Roller Bearing Company, Canton, Ohio, a corporation of Ohio Application January 2, 1935, Serial No. 23

9 Claims. (Cl. 295—36)

My invention relates to that type of roller bearing axle construction for locomotive and other rail vehicles wherein the axle is rotatably mounted in an axle housing that has bearing box portions at its ends, the roller bearings being mounted on the axle and in said bearing box portions and the wheels being mounted on the ends of said axle beyond the ends of said axle housing. The present invention has for its principal objects to simplify and strengthen such constructions and to facilitate the mounting and removal of the bearings. Other objects and advantages will appear hereinafter.

The invention consists principally in the provision of separate bearing box members mounted on the ends of the axle housing. The invention further consists in the roller bearing axle construction and in the parts and combinations and arrangements of parts hereinafter described and claimed.

In the accompanying drawings, wherein like reference characters refer to like parts wherever they occur, Fig. 1 is a half plan view, half sectional view on the line 1—1 in Fig. 2, of a roller bearing axle construction embodying my invention, Fig. 2 is a half side elevation, half sectional view on the line 2—2 in Fig. 1, Fig. 3 is a half end view, half vertical sectional view on the line 3—3 in Fig. 1, Fig. 4 is a longitudinal sectional view showing the operation of stripping the axle from the bearing, Fig. 5 is a horizontal sectional view, similar to Fig. 1, of a modification, Fig. 6 is a longitudinal vertical sectional view, similar to Fig. 2 of said modification, Fig. 7 is a half plan view, half sectional view on the line 7—7 in Fig. 8, showing another modification, Fig. 8 is a half side elevation, half sectional view on the line 8—8 in Fig. 7, and Fig. 9 is a half end view, half sectional view on the line 9—9 in Fig. 7.

In the construction shown in Figs. 1 to 4, an axle 1 has wheels 2, fixed on its ends, preferably with the usual press fit, and is rotatably mounted in an axle housing 3 that has separate bearing boxes 4 mounted on its ends, said bearing boxes being adapted for cooperation with frame members 5. The construction shown in the drawings is a locomotive drive axle.

Each end of the axle housing is provided with an outwardly extending radial flange or rib 6 from which a tubular portion 7 with a cylindrical periphery extends outwardly. The ends of the axle housing body project as sleeve portions 8 into the chambers formed by said outer cylindrical portions 7. Mounted on each outer cylindrical portion 7 of the axle 1 is a bearing box 9 having a cylindrical bore that may be lightly pressed on said cylindrical seat portion 7. Each bearing box 9 has a radially extending flange or end wall portion 10 that is disposed adjacent to the rib 11 formed by the portion of said housing rib that projects beyond said seat 7. A washer 12 and semi-circular shims 13 may be interposed between the end wall 10 of the bearing box 9 and the housing rib 11, the position of the box on said housing obviously being determined by the number and thickness of said shims. The bearing box 9 is secured to the housing 3 by means of screws 14 extending through said housing rib into threaded holes in the end wall 10 of the bearing box 9. The external configuration of the bearing box is of the proper shape to cooperate with any desired type of frame 5.

Seated in each bearing box 9 against an outer annular end wall 15 that is integral with said box is the cup 16 or outer bearing member of a taper roller bearing, the cone 17 or inner bearing member being mounted on the axle 1 and tapered bearing rollers 18 being interposed between said bearing members, preferably with a suitable cage 19 for said rollers. The bearings are disposed with the large ends of the rollers inwardly, that is, the bearing mounting is of the "direct" type. Interposed between the inner bearing cones 17 is a spacer sleeve 20 that has rings 21 secured to its ends and abutting against said bearing cones 17. In the bore of the outer end wall 15 of the bearing box 9 is a closure ring 22 that cooperates with a ring 23 mounted on the axle between the wheel hub and the adjacent bearing cone 17.

With the body of the housing 3 in position, the bearing cones 17 are secured upon the axle as desired, usually with a press fit with their ends against the ends of the spacer sleeve 20, the cages 19 and bearing rollers 18 being mounted on said bearing cones 17. The bearing boxes 9 are then placed on the cylindrical seat portions 7 of the axle housing 3, the requisite number of shims 13 necessary to give proper running clearance for the bearings inserted and the bearing boxes pressed home and secured in place by the screws 14.

If it becomes necessary to strip the axle from the bearings, the bearing boxes 9 may be loosened by removing the screws 14 and the shims 13, then the body of the axle housing 3 is mounted in the yoke 24 of a press and the ram 25 of the press is forced against the axle 1. This strips the axle from the wheel 2 and bearing at one end, the inside sleeve portion 8 of the housing 3 engaging the inner end of the bearing cone 17 during the stripping operation, as shown in Fig. 4. The operation is then repeated at the other end of the axle.

In the modification shown in Figs. 5 and 6, an indirect mounting of the bearings is shown, that is, each bearing is arranged with the smaller ends of its rollers 18a disposed inwardly. In this modified construction, the axle housing 3a has a cylindrical end portion 7a and an outwardly projecting annular rib or flange 11a at the innermost end of said cylindrical portion. A ring 30 is mounted on said cylindrical seat 7a, the outside diameter of said ring 30 being the same as that of the bearing cup 16a. A washer 12a is interposed between the innermost end of said ring 30 and the outer face of said housing rib 11a and shims 13a are interposed between said washer and the face of the end flange 10a of the bearing box 9a, thereby properly positioning the bearing box.

The axle housing is provided near each end with an inwardly extending radial flange 31 that overlaps the abutment ring 21a at the end of the spacer sleeve 20a, so that in stripping the axle, one of said flanges engages the adjacent abutment ring to assist in the stripping operation.

The construction shown in Figs. 7, 8 and 9 is similar to that shown in Buckwalter Patent No. 1,967,806 dated July 24, 1934, so far as concerns the external configuration of the bearing boxes 9b, and the bearing construction and arrangement. The bearings are of the double row direct mounted type, the outer bearing cups 16b being provided with a reinforcing ring 40 of the type shown in Buckwalter Patent No. 1,967,807. The bearing boxes 9b are provided with openings 41 in their sides through which project the flattened side portions 42 of the bearing cups 16b. Bearing plates 43 are welded to said housing and co-operating bearing plates 44 are secured in the pedestal portions 45 of the truck side frame 5b.

The constructions above described have important practical advantages. They eliminate the necessity of longitudinal splitting of the axle housing, they strengthen the end portions of the housing where great stresses occur, they locate the securing screws at a point where they are relieved of end thrust and where they are easily accessible, they eliminate the necessity for separate closure rings at the outer ends of the housing and they facilitate the operation of mounting the bearings and stripping the axle from the bearings.

As appears from the drawings, the invention readily lends itself to the mounting of bearings of different types in journal boxes of various constructions. Obviously, the modifications hereinbefore shown and described are only typical of the numerous modifications to which my invention lends itself, and I do not wish to be limited to the details of construction hereinbefore set forth.

What I claim is:

1. A roller bearing axle construction comprising an axle, wheels on the ends of said axle, a housing surrounding said axle between said wheels and in which said axle is rotatable, a bearing box sleeved over each end of said housing, and roller bearings interposed between said axle and said bearing boxes, said bearing boxes each having an integral outer end ring forming a seat for the outer bearing member of said bearing.

2. A roller bearing axle construction comprising an axle, wheels on the ends of said axle, a housing surrounding said axle between said wheels and in which said axle is rotatable, said housing having a cylindrical seat at each end and an outwardly extending radial rib at the innermost end of each of said seats, a bearing box mounted on each of said seats and secured to said rib, and roller bearings interposed between said axle and said bearing boxes.

3. A roller bearing axle construction comprising an axle, wheels on the ends of said axle, a housing surrounding said axle between said wheels and in which said axle is rotatable, said housing having a cylindrical seat at each end and an outwardly extending radial rib at the innermost end of each of said seats, a bearing box mounted on each of said seats and secured to said rib, screws extending through said rib into said bearing box, and roller bearings interposed between said axle and said bearing boxes.

4. A roller bearing axle construction comprising an axle, wheels on the ends of said axle, a housing surrounding said axle between said wheels and in which said axle is rotatable, said housing having a cylindrical seat at each end and an outwardly extending radial rib at the innermost end of each of said seats, a bearing box mounted on each of said seats and secured to said rib, screws extending through said rib into said bearing box, shims between said rib and said bearing box, and roller bearings interposed between said axle and said bearing boxes.

5. A roller bearing axle construction comprising an axle, a housing surrounding said axle and in which said axle is rotatable, bearing boxes sleeved over the ends of said housing, taper roller bearings interposed between said axle and said bearing boxes, and a spacer sleeve between the inner bearing members of said bearings.

6. A roller bearing axle construction comprising an axle, a housing surrounding said axle and in which said axle is rotatable, bearing boxes sleeved over the ends of said housing, taper roller bearings interposed between said axle and said bearing boxes, and a spacer sleeve between the inner bearing members of said bearings, said axle housing having an inside sleeve portion at each end for cooperation with said inner bearing members in stripping the axle from the bearings.

7. A roller bearing axle construction comprising an axle, a housing surrounding said axle and in which said axle is rotatable, bearing boxes sleeved over the ends of said housing, taper roller bearings interposed between said axle and said bearing boxes, and a spacer sleeve between the inner bearing members of said bearings, said spacer sleeve having a ring at each end abutting against the adjacent inner bearing member and said housing having end portions overlapping said rings and pressing them against the adjacent inner bearing members in stripping the axle from the bearings.

8. A roller bearing axle construction comprising an axle, a housing surrounding said axle and in which said axle is rotatable, said housing having a cylindrical seat at its end and an outwardly extending radial flange at the innermost end of said seat, a spacer ring on said seat adjacent to said flange, a bearing box mounted on said ring, screws securing said rib and said bearing box together, a conical bearing cup in said box abutting against said spacer ring, a bearing cone on said axle and conical bearing rollers between said cup and said cone.

9. A roller bearing axle construction comprising an axle, a housing surrounding said axle and in which said axle is rotatable, bearing boxes sleeved over the ends of said housing, and taper roller bearings interposed between said axle and said bearing boxes, said axle housing having an inside sleeve portion at each end for cooperation with parts of said bearing in stripping the axle from the bearings.

CLIFFORD L. EASTBURG.